United States Patent [19]

McArthur et al.

[11] 4,286,954

[45] Sep. 1, 1981

[54] METHOD OF FOLDING AN INFLATABLE RESTRAINT CUSHION

[75] Inventors: Donald N. McArthur, Clarkston; Robert A. Heintz, Northville, both of Mich.

[73] Assignee: General Motors Corporation, Detroit, Mich.

[21] Appl. No.: 99,886

[22] Filed: Dec. 3, 1979

[51] Int. Cl.$^3$ ............................................. B60R 21/06
[52] U.S. Cl. ..................................... 493/244; 280/743
[58] Field of Search ................... 93/32, 84 TW, 84 R; 280/743, 728–730, 732, 734, 740; 270/68 R, 78; 493/244, 243, 409, 405

[56] References Cited

U.S. PATENT DOCUMENTS

| | | |
|---|---|---|
| 3,473,824 | 10/1969 | Carey et al. .................. 280/743 X |
| 3,610,657 | 10/1971 | Cole .............................. 280/729 |
| 3,618,978 | 11/1971 | Klove, Jr. et al. .............. 280/730 |
| 3,630,472 | 12/1971 | Axenborg ..................... 280/730 X |
| 3,768,830 | 10/1973 | Hass ............................. 280/743 X |
| 3,774,936 | 11/1973 | Barnett et al. ................. 280/730 |
| 3,797,855 | 3/1974 | Wright ......................... 280/743 X |
| 3,839,947 | 10/1974 | Kornas et al. ................. 93/32 |
| 3,839,948 | 10/1974 | Putti et al. .................... 93/32 |
| 3,887,109 | 6/1975 | Libkie ........................... 280/740 X |
| 3,887,214 | 6/1975 | Brawn ........................... 280/730 |

Primary Examiner—James F. Coan
Attorney, Agent, or Firm—Edward J. Biskup

[57] ABSTRACT

A method of folding an inflatable restraint cushion for storage in a support housing which is mountable to the lower portion of the instrument panel of a vehicle. The method involves forming pleats in the cushion in a manner that, during initial deployment, the cushion mass acting on an occupant located in the proximity of the instrument panel is reduced.

2 Claims, 8 Drawing Figures

METHOD OF FOLDING AN INFLATABLE RESTRAINT CUSHION

The invention relates to inflatable restraint systems and more particularly concerns a method of folding a restraint cushion for storage into a support housing which subsequently is mounted to the instrument panel of a vehicle.

One method of storing an inflatable cushion within a support housing can be seen in Klove, Jr. U.S. Pat. No. 3,618,978, which issued on Nov. 9, 1971. In this regard, it will be noted that the deflated cushion is stored in a rolled condition below the frontal surface of the instrument panel with the coil extending generally upwardly with respect to the vehicle. In such case and when inflated, the cushion unrolls and deploys in a direction rearwardly of the vehicle between the frontal surface of the instrument panel and the occupant's knees with an upper wall portion of the cushion unrolling along the frontal surface of the instrument panel. A lower wall portion of the cushion unrolls along the knees and upper leg portions of the occupant and an end wall portion of the cushion engages the torso of the occupant. The cushion thus applies a rearward and downward force to the seated occupant.

This invention concerns a method of folding a restraint cushion for storage in a support housing so as to reduce the cushion mass acting on an occupant located in the proximity of the instrument panel during the initial deployment of the cushion. In addition, this method of folding the cushion tends to cause the latter to deploy in a generally upward path relative to the support housing during inflation. More specifically, the support housing in which the cushion is stored, has a cavity formed therein for accommodating a gas generator and diffuser. The cavity is defined by an upper wall, a lower wall and a pair of side walls. The cushion includes two overlying flat sheets of woven material arranged to form a top sheet and a bottom sheet with the sheets being joined together along the front and rear edges as well as the side edges to form a closed compartment which communicates with the gas generator and diffuser. According to the invention, the front edge of the sheets are initially mounted to the diffuser. Afterwards, the rear edge of the sheet is placed along an imaginary line which is parallel to the front edge and spaced therefrom a distance which causes the sheets to be taut. A portion of the top sheet is grasped along an imaginary transverse line located substantially midway between the front edge and the rear edge and is moved to a position adjacent the front edge to form a pleat and a new rear edge spaced forwardly from a line along which the original rear edge was located. This step is then repeated to form additional pleated sections until the latter attains a fore and aft dimension which approximates the distance between the top and bottom walls of the cavity in the support housing. At this point, the pleated sections are rotated as a unit into the cavity for storing the cushion in the housing until the cushion is inflated by the gas generator.

A more complete understanding of the present invention will be apparent from the following detailed description when taken with the drawings in which.

Figure 1:
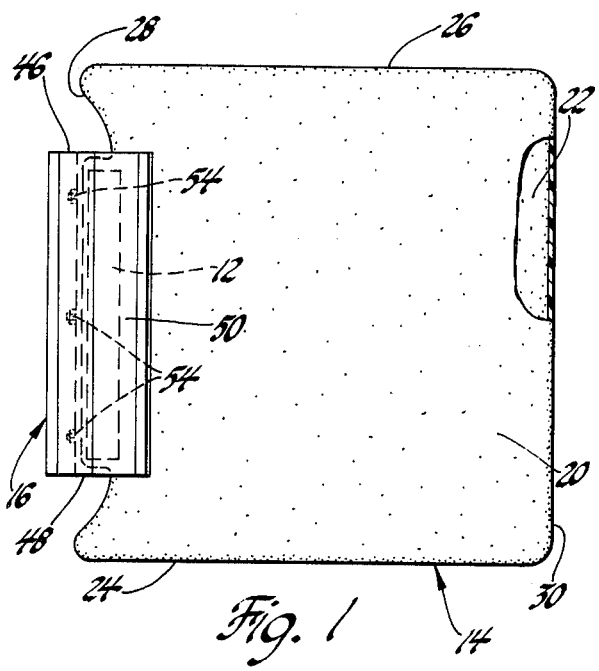
FIG. 1 is a plan view of an inflatable restraint cushion in the deflated state preparatory to being folded into a support housing.
Figure 8:
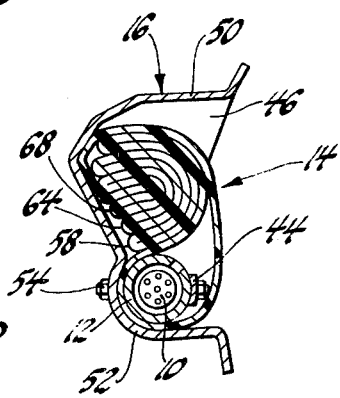
FIG. 8 is an enlarged sectional view showing the cushion located within the support housing after being folded in accordance with the present invention.

Referring to the drawings and more particularly FIGS. 1 and 8, a gas generator 10 and a cylindrical elongated diffuser 12 are shown located within the closed confinement of a main or torso cushion 14 a portion of which is fixedly held between the diffuser and a J-shaped support housing 16. Although not shown, the front portion of the diffuser 12 can have a knee cushion attached thereto, which when inflated, helps maintain the center occupant and right-hand seat occupant in seated positions as explained in Cole U.S. Pat. No. 3,610,657, which issued on Oct. 5, 1971 and is assigned to the assignee of this invention.

Figure 3:
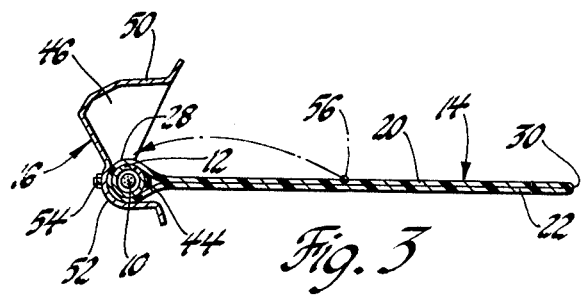
FIG. 3 is a cross-sectional view of the cushion taken on line 3—3 of FIG. 2.

As seen in FIGS. 1 and 3, the torso cushion 14 consists of superimposed, rectangular top and bottom sheets 20 and 22 both of which are joined together along the parallel side edges 24 and 26, the front edge 28 and the rear edge 30 so as to provide a closed confinement. In cases where a knee cushion is combined with the torso cushion, it would have the front edge of the knee cushion fixed to the diffuser 12 by a bracket 44 and, as explained in copending patent application Ser. No. 054,633, filed on July 3, 1979, in the name of Donald H. suszko et al, suitable porting would be provided in the diffuser 12 for allowing gases to flow separately into the torso cushion 14 and the knee cushion.

The gas generator 10 is concentrically located within the diffuser 12 that extends between a pair of laterally spaced side walls 46 and 48 which together with an upper wall 50 and lower wall 52 define a cavity. If used the knee cushion would be made from an impervious material, while the torso cushion 14 would be made of a porous woven material so as to allow gas to escape and reduce rebound upon impact. Although not shown, the support housing 16 is intended to be mounted below an instrument panel as seen in FIG. 1 of the afore-mentioned Suszko et al patent application. It has been found that when the torso cushion 14 is folded in a manner to be described hereinafter, then during initial deployment, the mass of the cushion acting on an occupant located in the proximity of the instrument panel is reduced. It has also been found that the torso cushion 14 tends to follow a generally upward path relative to the instrument panel during inflation so that both the windshield and instrument panel are covered by the cushion as quickly as possible after a collision.

Figure 2:
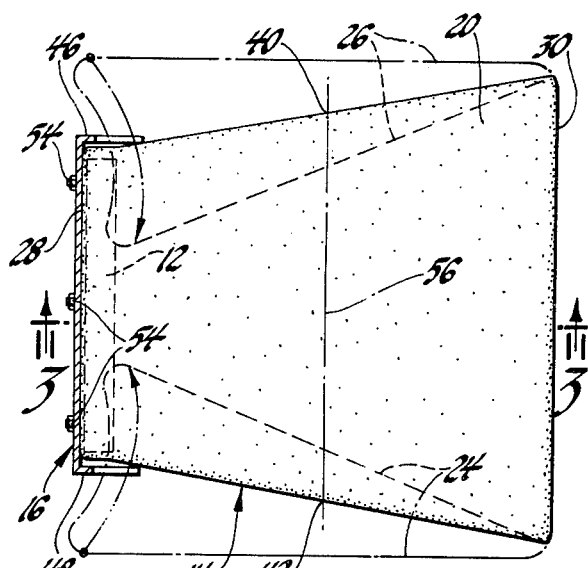
FIG. 2 is similar to FIG. 1 but shows two corners of the cushion tucked inwardly.
Figure 4:
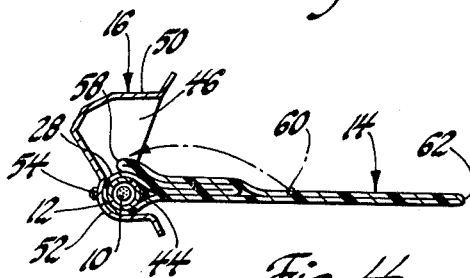
FIGS. 4–6 are views similar to FIG. 3 and illustrate additional steps performed in accordance with the present invention for folding the cushion for storage into the support housing.
Figure 5:
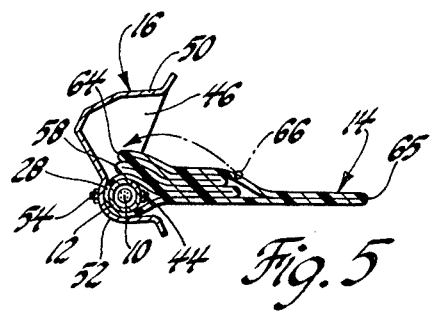
Figure 6:
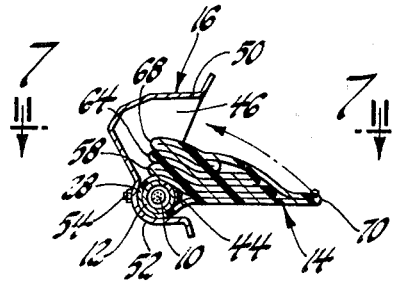
Figure 7:
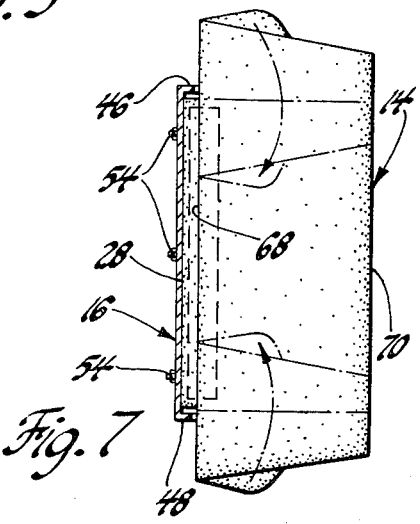
FIG. 7 is a plan view taken on line 7—7 of FIG. 6.

As seen in FIG. 1, the method of folding the cushion according to the present invention requires that, initially, the torso cushion 14 be combined with the gas generator 10 and diffuser 12 and afterwards mounted to the support housing 16 through the usual stud and nut arrangement 54. If a knee cushion is combined with the torso cushion, the latter would initially be attached to the diffuser 12 by the bracket 44 and double-roll folded into engagement with the diffuser as shown in U.S. Pat. No. 3,791,671, issued on Feb. 12, 1974 in the name of John F. Zens and U.S. Pat. No. 3,839,948, issued on Oct. 8, 1974, in the names of Marino V. Putti, et al. Afterwards, the diffuser 12, together with the folded knee bag would be placed within the torso cushion 14, and the torso cushion 14 would then be drawn taut at the rear edge 30 so as to assume the configuration shown in FIG. 1. This is followed by the two corners adjacent side walls 46 and 48 of the support housing 16 being tucked inwardly so they are located between the top and bottom sheets 20 and 22 of the torso cushion 14 as seen in FIG. 2. By so doing, two triangular portions are located between the top and bottom sheets 20 and 22 of the cushion 14. Afterwards, and as seen in FIGS. 2 and 3, the material of the top sheet 20 along a transverse imaginary line 56 parallel to edges 28 and 30, is grasped at the outer edges of the material as indicated by reference numerals 40 and 42 and moved to the left to form a first full width pleat 58 of a predetermined length as seen in FIG. 4. As seen in FIGS. 1 and 3, the imaginary line 56 is located approximately midway between the vertical center of the gas generator 10 and the rear edge 30 of the torso cushion 14. This is followed by again grasping the top material of the torso cushion 14 at the outer edges of the material along a transverse imaginary line 60 located approximately midway between the vertical center of the gas generator 10 and the forwardly located and new right hand edge 62, as seen in FIG. 4, and moving it to the left to form a second pleat 64 which is shorter than and overlies pleat 58. As seen in FIG. 5, the midway portion of the top material between the vertical center of the gas generator 10 and the forwardly located and new rear edge 65 of the torso cushion 14 along an imaginary transverse line 66 is then grasped at the outer edge of the material and moved forwardly to form a third pleat 68 located on pleats 58 and 64 as seen in FIG. 6. Pleating of the top material is continued in this manner to form progressively shorter pleat sections until the distance from the vertical center of the gas generator 10 to the tail end 70 of the torso cushion 14, as seen in FIG. 6, is approximately the same in size as the full opening of the cavity in support housing 16 measured along a substantially vertical axis. The outer flaps extending outboard of the side walls 46 and 48 as seen in FIG. 7 are the folded inwardly so that the sidewise size of the cushion then assumes a dimension slightly less than the longitudinal length of the cavity in the support housing 16. At this time, the tail end 70 is folded onto the pleats 58, 64 and 68, as seen in FIG. 7, and the entire cushion is then rotated into the support housing 16, as seen in FIG. 8, to complete the folding and storage operation. A clear sheet of polyethylene is then wrapped around the support housing 16 to retain the folded cushion in the support housing 16 for subsequent mounting to the instrument panel of the vehicle.

As alluded to hereinbefore and as seen in FIG. 1, the torso cushion 14 has a sidewise dimension which is greater than the longitudinal length of the support housing 16. As a result, the corners have to be tucked in as shown in FIG. 2 and the flaps folded inwardly as seen in FIG. 7. As should be apparent, the latter steps would not be required if the cushions correspond in sidewise size with the longitudinal length of the cavity in the support housing 16. In other words, the steps in FIGS. 2 and 7 are necessitated by the size of the disclosed cushion and would, of course, not be required if the sidewise dimension of the cushion was the same or less than the longitudinal length of the cavity in the support housing 16. In such case, only the pleating steps as set forth 3–6 would be required to realize the advantages of this invention.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A method of folding an inflatable restraint cushion for storage in a support housing having a cavity in which a gas generator is located within a diffuser and is fixedly secured in said cavity, said cavity being defined by an upper wall, a lower wall and a pair of side walls, and said inflatable restraint cushion including two overlying flat sheets of flexible material arranged to form a top sheet and a bottom sheet with the sheets being joined together along a front edge, a pair of laterally spaced side edges and a rear edge, said method comprising the steps of:
   (a) mounting said front edge of said sheets to said diffuser;
   (b) placing said rear edge of said sheets along an imaginary line which is parallel to said front edge and spaced from the latter a distance which causes said top and bottom sheets to be taut;
   (c) successively moving a portion of said top sheet towards said diffuser so as to form a series of overlying pleated sections which are progressively shorter in length until the overall fore and aft dimension of said cushion approximates the distance between said top and bottom walls of said cavity;
   (d) and rotating said cushion as a unit into said cavity for storing said cushion until the latter is inflated by said gas generator.

2. A method of folding an inflatable restraint cushion for storage in a support housing having a cavity in which a gas generator is located within a diffuser and is fixedly secured in said cavity, said cavity being defined by an upper wall, a lower wall and a pair of side walls, and said inflatable restraint cushion including two overlying flat sheets of flexible material arranged to form a top sheet and a bottom sheet with the sheets being joined together along a front edge, a pair of laterally spaced side edges and a rear edge, said method comprising the steps of:
   (a) mounting said front edge of said sheets to said diffuser;
   (b) placing said rear edge of said sheets along an imaginary line which is parallel to said front edge and spaced from the latter a distance which causes said top and bottom sheets to be taut;
   (c) grasping a portion of said top sheet along an imaginary transverse line located substantially midway between said front edge and said rear edge;
   (d) moving said portion of said top sheet to a position adjacent said front edge to form a pleated section and a new rear edge spaced forwardly from a line along which the original rear edge was located;
   (e) repeating steps (c) and (d) until said cushion attains an overall fore and aft dimension which approximates the distance between said top and bottom walls of said cavity;
   (f) and rotating said pleated sections as a unit into said cavity for storing said restraint cushion until the latter is inflated by said gas generator.

* * * * *